US012643492B2

(12) United States Patent
Usami et al.

(10) Patent No.: US 12,643,492 B2
(45) Date of Patent: Jun. 2, 2026

(54) CONNECTION STRUCTURE OF WIRE HARNESS

(71) Applicant: Mazda Motor Corporation, Hiroshima (JP)

(72) Inventors: Ikuo Usami, Aki-gun (JP); Akihiro Furukawa, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 153 days.

(21) Appl. No.: 18/646,796

(22) Filed: Apr. 26, 2024

(65) Prior Publication Data

US 2024/0367597 A1    Nov. 7, 2024

(30) Foreign Application Priority Data

May 1, 2023    (JP) ................................. 2023-075415

(51) Int. Cl.
*B60R 16/02* (2006.01)
*H01R 4/20* (2006.01)
*H02G 15/18* (2006.01)

(52) U.S. Cl.
CPC ......... *B60R 16/0215* (2013.01); *H01R 4/203* (2013.01); *H02G 15/18* (2013.01); *H01R 2201/26* (2013.01)

(58) Field of Classification Search
CPC .......... H01R 4/18; H01R 4/182; H01R 4/183; H01R 4/021; H01R 4/20; H01R 4/72; B60R 6/0215
See application file for complete search history.

(56) References Cited

U.S. PATENT DOCUMENTS 8,485,992 B2 * 7/2013 Griffin .................. A61M 25/00
600/585
2007/0252270 A1 * 11/2007 Takano ................... H01L 25/16
257/E23.105

(Continued)

FOREIGN PATENT DOCUMENTS

JP      2010-198979 A    9/2010
JP      2017-130254 A    7/2017

OTHER PUBLICATIONS

Extended European Search Report issued Sep. 25, 2024 in corresponding European Patent Application No. 24 17 1554, 8 pages.

*Primary Examiner* — Paresh Paghadal
(74) *Attorney, Agent, or Firm* — XSENSUS LLP

(57) ABSTRACT

A connection structure of a wire harness enables the wire harness to be severed in the event of a vehicle collision. End portions of electric wires are respectively provided with connection end portions in which conductors of the end portions have been subjected to fusing processing, the connection end portion has an extension portion and a protruding portion, the protruding portion is at least partially provided with a tapered portion, the connection end portions are integrally connected to each other by crimping the extension portions from the radial-direction outer side by the connecting member, and at the connection end portion, the crimping of an extension portion to press the tapered portion inserted in a concave portion causes the engagement force between the extension portion and the connecting member to become weaker than the engagement force between the extension portion and the connecting member when applying tension to the electric wires.

5 Claims, 6 Drawing Sheets

(56)     References Cited

U.S. PATENT DOCUMENTS

| | | | |
|---|---|---|---|
| 2010/0216356 A1* | 8/2010 | Takehara | H01R 43/28 |
| | | | 439/863 |
| 2013/0199841 A1* | 8/2013 | Lehmann | H01R 4/187 |
| | | | 174/75 R |
| 2018/0134238 A1* | 5/2018 | Araki | H01R 12/63 |
| 2018/0175573 A1* | 6/2018 | Huber | H01R 4/021 |
| 2019/0267723 A1* | 8/2019 | Suzuki | G01K 7/22 |
| 2020/0036107 A1* | 1/2020 | Shimizu | H01R 4/183 |

* cited by examiner

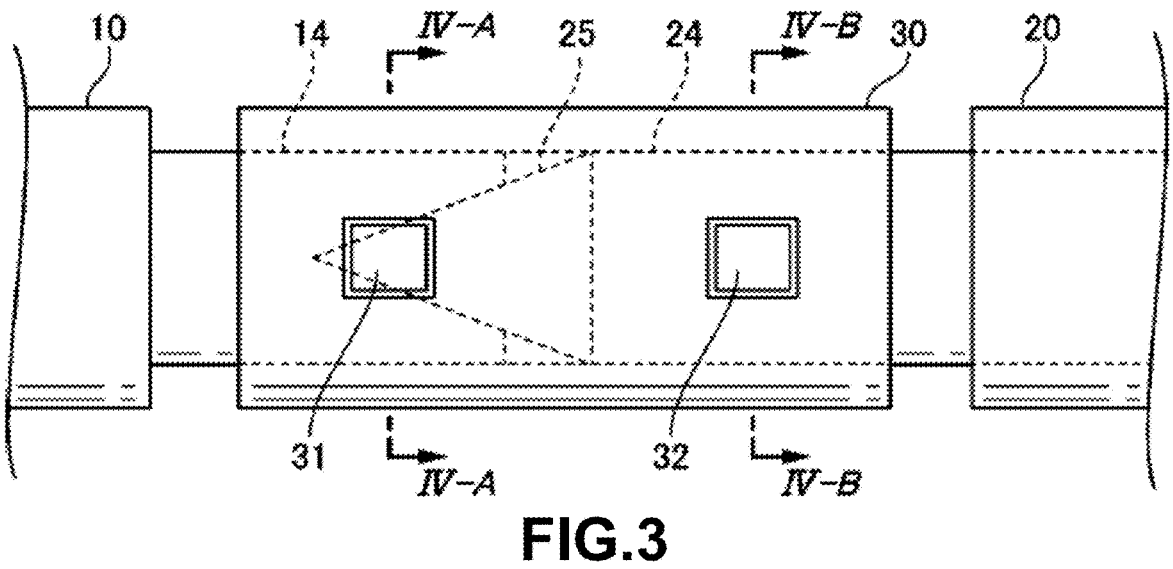
FIG.3
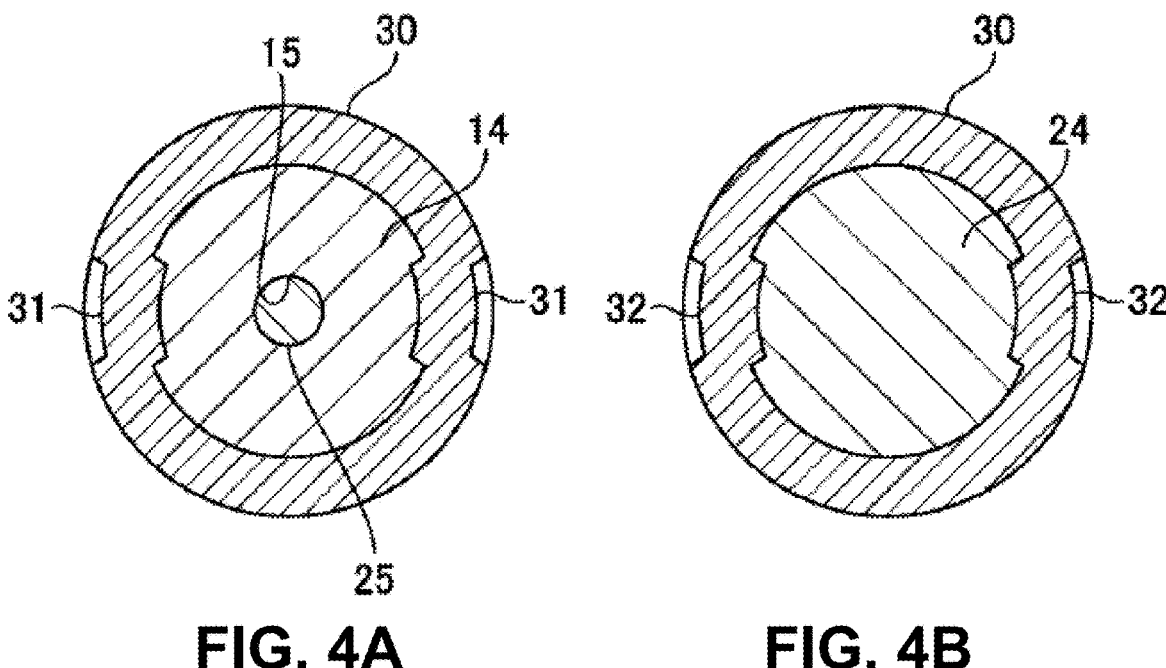
FIG. 4A          FIG. 4B

CONNECTION STRUCTURE OF WIRE HARNESS

CROSS-REFERENCE TO RELATED APPLICATION

The present application claims priority to Japanese Patent Application 2023-075415, filed May 1, 2023, the entire contents of which are incorporated herein by reference.

BACKGROUND

Technical Field

The present disclosure relates to a connection structure of a wire harness, and particularly relates to a connection structure of a wire harness in which two electric wires are connected.

Description of Related Art

Conventionally, for example, in order to connect electrical components of a vehicle to one another, wire harnesses are routed inside the vehicle. There is a case where two electric wires are connected to each other in such a wire harness. For example, Patent Literature 1 has proposed a connection structure of a wire harness in which two electric wires are connected to each other by a cylindrical member while end faces of the two electric wires are butted against each other.

Patent Literature 1 describes a structure in which two electric wires (an electric wire having a strand conductor formed by twisting a large number of element wires and an electric wire having a single-core conductor made of solid metal) are crimped and connected to each other by a cylindrical member made of a conductor. In other words, end portions of both the electric wires are inserted into the cylindrical member, and the cylindrical member is pressed inwardly from an outside in the entire circumferential direction thereof while the end surfaces of both the electric wires are butted against each other in an axial direction. As a result, the cylindrical member is deformed, so that the end portions of both the electric wires are crimped and connected to each other.

Further, there has also been known a socket-contact technique that causes a number of contact points to occur on a grid having a hyperbolic shape in order to increase the contact area, whereby a large amount of current can be caused to flow in a connector for connecting two electric wires (for example, RADSOK (registered trademark) which is a socket contact produced by Amphenol Corporation, etc.).

CITATION LIST

Patent Literature

[Patent Literature 1] Japanese Patent Laid-Open No. 2017-130254

SUMMARY

Problems to be Solved

However, in the connection structure as described in Patent Literature 1, the end faces of the two electric wires which are substantially perpendicular to the axial direction are merely butted against each other, so that the contact is uncertain due to unevenness of the end surfaces, and the contact area is small. For this reason, the contact resistance of the two electric wires is relatively high, and it is easier for current to flow through the outer cylindrical member rather than flow between the end faces of the two electric wires at the connection site. In order to increase the connection area of the end faces in the connection structure of Patent Literature 1, the diameters of the two electric wires must be increased, but this results in an increase in the overall weight of the wire harness. Further, the contact area itself can be increased by using the socket contact described above, but the structure is more complicated than that of Patent Literature 1, which makes the connection structure larger in size.

Furthermore, in recent years, electric motors, etc. in electric automobiles have come to be driven with high voltage and large current. For this reason, electric wires whose conductor portions have larger diameters have been used for wire harnesses. Therefore, there has been a problem that the increase in size of wire harnesses as described above increasingly causes increase in weight of vehicles.

The present disclosure has been made to solve these problems, and has an object to provide a connection structure of a wire harness that can suppress increase in weight of wire harnesses.

Solutions to the Problems

In an exemplary embodiment, a connection structure of a wire harness includes a first electric wire and a second electric wire connected to each other by a connecting member, wherein end portions of the first electric wire and the second electric wire are respectively provided with a first connection end portion and a second connection end portion in which conductors of the end portions have been subjected to fusing processing, the first connection end portion comprises a first extension portion extending in an axial direction of the first electric wire, and a concave portion extending from an end surface of the first extension portion into the first extension portion, the second connection end portion comprises a second extension portion extending in an axial direction of the second electric wire, and a protruding portion extending from the second extension portion to a tip in an axial direction thereof, the protruding portion comprising at least partially a tapered portion that is tapered toward a tip in an axial direction thereof, and the first connection end portion and the second connection end portion are integrally connected to each other by crimping the first extension portion and the second extension portion from a radial-direction outer side by the connecting member in a state where the protruding portion is inserted in the concave portion.

Conventionally, the two electric wires are merely crimped and connected to each other by the connecting member while the end surfaces of two electric wires that are substantially perpendicular to the axial direction are simply butted against each other, so that direct physical contact between the two electric wires is insufficient, and the contact area thereof is small. On the other hand, in the present disclosure, the first extension portion of the first electric wire and the second extension portion of the second electric wire are crimped by the connecting member in a state where the protruding portion of the second extension portion which has been subjected to fusing processing is inserted into the concave portion of the first extension portion which has also been subjected to the fusing processing. As a result, in the present disclosure, under the connected state, the first electric wire and the second electric wire are electrically surely connected to each other by the physical connection between the concave portion and the protruding portion, and it is easier to secure a larger contact area as compared with a case where the end surfaces perpendicular to the axial direction are merely in contact with each other. Therefore, in the present disclosure, at the connection site between the two electric wires, current easily dispersedly flows not only through the outer edge portions of the electric wires, but also over substantially the entire cross sections of the conductor portions. Therefore, in the present disclosure, there is no need to use an electric wire including a conductor portion having a larger diameter, and it is possible to use an electric wire having a smaller diameter compared to a conventional wire harness so that it is possible to reduce the weight of the wire harness.

Further, in the present disclosure, such a configuration is preferable that the first extension portion is crimped by the connecting member at the first connection end portion such that an engagement force between the first extension portion and the connecting member becomes weaker than an engagement force between the second extension portion and the connecting member when tension is applied to the first electric wire and the second electric wire, thereby causing the first extension portion to press the tapered portion inserted in the concave portion to a radial-direction inner side, and when predetermined tension is applied to the first electric wire and the second electric wire in the axial direction, the tapered portion and the concave portion are separated from each other in the axial direction, and engagement between the first extension portion and the connecting member is released.

For example, in a conventional wire harness as shown in Patent Literature 1, two electric wires are firmly crimped (crimped and connected) by a connecting member, so that the electric wires are hard to disconnect at the connection site in the event of a vehicle collision. For this reason, with respect to this wire harness, it is not possible to predict where the wire harness is severed in the overall length direction thereof in the event of a collision. For example, in a vehicle having an in-wheel motor, a battery is provided on the vehicle body side, the in-wheel motor is provided integrally with the wheel, and the battery and the in-wheel motor are connected to each other by the wire harness. In such a vehicle, the wire harness may be severed at unspecified locations during a collision.

On the other hand, the present disclosure is configured such that the connecting member crimps the first extension portion and the second extension portion in a state where the tapered portion of the protruding portion inserted in the concave portion of the first extension portion. Therefore, when predetermined tension is applied to the first electric wire and the second electric wire, the engagement between the concave portion and the tapered portion is loosened, and the engagement force between the first extension portion and the connecting member is more likely to be reduced as compared with the engagement force between the second extension portion and the connecting member. In other words, in the present disclosure, since the tapered portion and the concave portion are in contact with each other to be inclined with respect to the axial direction, it is possible to separate them from each other by a predetermined tensile force. When the tapered portion is even slightly pulled away from the recessed portion, the engagement force between the first extension portion and the connecting member is reduced, which allows them to be detached. As a result, in the present disclosure, when predetermined tension is applied to the wire harness in the event of a vehicle collision, the first electric wire can be easily separated from the connecting member. Therefore, in the present disclosure, by arranging the connection structure of the wire harness at an appropriate position in the vehicle, it is possible to control a severing position so that the wire harness can be severed at an appropriate severing position in the event of a vehicle collision.

Further, in an exemplary embodiment, the present disclosure further comprises a first cover member that covers the first connection end portion, and a second cover member that covers the second connection end portion, wherein the first cover member extends from the first electric wire beyond the first extension portion, and the second cover member extends from the second electric wire beyond the connecting member.

Accordingly, when predetermined tension is applied to the wire harness and the first electric wire and the second electric wire are separated from each other at the connection site, the first extension portion is covered by the first cover member, and the second extension portion and the connecting member are covered by the second cover member. Therefore, it is possible to surely prevent the conductor portion of the wire harness from being exposed to the outside with a simple configuration. As described above, the present disclosure can provide a structure for reliable touch protection in the event of a vehicle collision.

Further, in an exemplary embodiment, the first extension portion has a polygonal shape in cross-section or a star polygonal shape in cross-section, and it is in contact with the connecting member at a plurality of sites in cross-sectional view in a state where the first extension portion is crimped by the connecting member.

Accordingly, it is possible to further reduce the engagement force between the first extension portion and the connecting member. For this reason, in the present disclosure, when predetermined tension is applied to the wire harness, the connection between the first extension portion and the connecting member can be more preferentially released than the connection between the second extension portion and the connecting member.

Further, in an exemplary embodiment, a conductive adhesive is filled in a non-contact site between the connecting member and the first extension portion in cross-sectional view.

Accordingly, it is possible to ensure high conductivity between the connecting member and the first extension portion.

Further, in an exemplary embodiment, the tapered portion is reduced in diameter toward the tip in the axial direction thereof so as to be tapered toward the tip in the axial direction.

Still further, in an exemplary embodiment, the concave portion and the protruding portion have shapes that complementarily engage with each other at least in a tip region of the protruding portion. Accordingly, it is possible to surely bring the inner circumferential surface of the concave portion and the outer circumferential surface of the protruding portion into surface contact with each other while the protruding portion is inserted in the concave portion.

Advantageous

According to the connection structure of the wire harness of the present disclosure, the wire harness can be severed in the event of a vehicle collision, and it is also possible to restrain an increase in the weight of the wire harness.

BRIEF DESCRIPTION OF DRAWINGS

FIG. 3 is an explanatory diagram of a connection site of the wire harness according to one or more exemplary aspects of the present disclosure.

FIG. 4A is an IV-A cross-sectional arrow view of FIG. 3, and FIG. 4B is an IV-B cross-sectional arrow view of FIG. 3.

DETAILED DESCRIPTION

An exemplary embodiment of the present disclosure will be described below with reference to the accompanying drawings.

Figure 1:
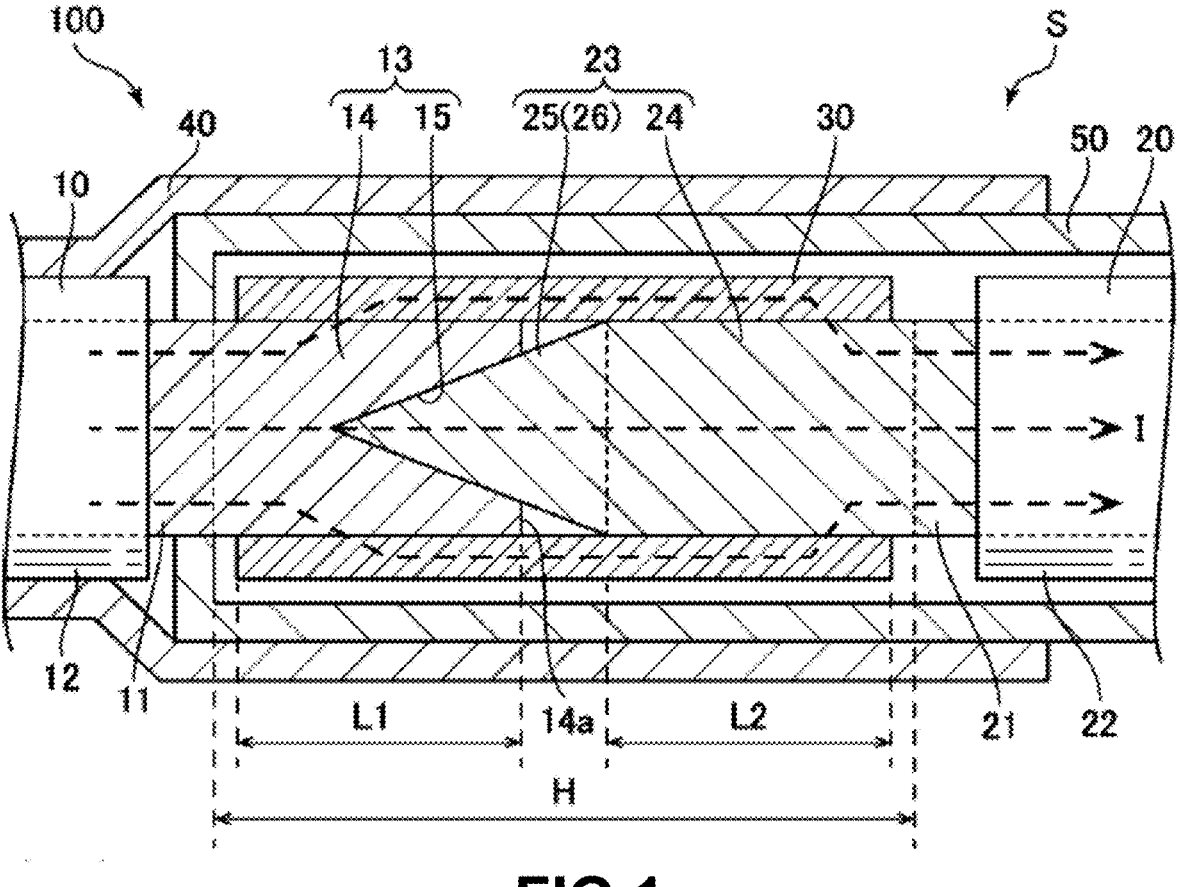
FIG. 1 is a partial sectional view of a connection structure of a wire harness according to one or more exemplary aspects of the present disclosure.
Figure 2:
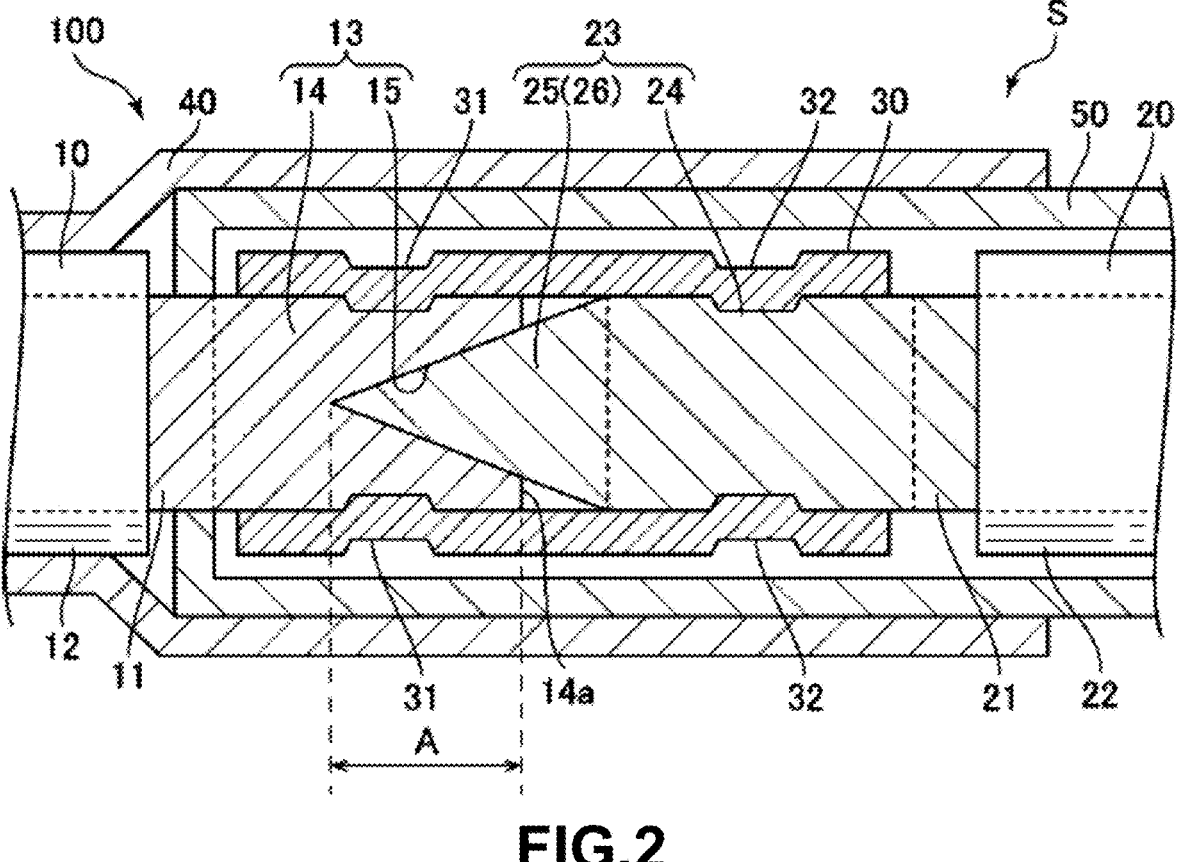
FIG. 2 is a partial sectional view of the connection structure of the wire harness according to one or more exemplary aspects of the present disclosure.

First, a connection structure of a wire harness according to an embodiment of the present disclosure will be described with reference to FIGS. 1 to 4. FIGS. 1 and 2 are partial sectional views of the connection structure of the wire harness, and FIG. 3 is an explanatory diagram showing a connection site of the wire harness, and FIG. 4 is a cross-sectional arrow view of FIG. 3.

In the present embodiment, a wire harness 100 is routed inside a vehicle, and electrically connects electrical components to one another. The electrical components include power sources (in-vehicle battery, etc.) and electric drive components (wheel hub motor, etc.).

As shown in FIG. 1, the wire harness 100 has a connection structure S in which two electric wires 10 and 20 extending in a longitudinal direction or axial direction thereof are connected by a connecting member 30 between electrical components. It is preferable that the electric wire 10 and the electric wire 20 have the same electric wire diameter (conductor diameter) so that the same current flows therethrough. The electric wire 10 and the electric wire 20 include strand wire conductors 11, 21 each of which is obtained by twisting a plurality of element wires together, and insulating coatings 12 and 22 covering the strand wire conductors 11, 21, respectively. The stranded conductors are made of copper, copper alloy, aluminum, aluminum alloy, or other metals or metal alloys.

In the connection structure S, connection end portions 13 and 23 of the electric wires 10, 20 are obtained by removing the insulating coatings 12, 22 by only predetermined lengths from end portions thereof, and fusing them into predetermined shapes. A fused area H is shown in FIG. 1. In other words, the connection end portions 13, 23 of the electric wires 10, 20 are formed into solid conductors having predetermined shapes by heating a plurality of element wires of each of the electric wires 10, 20 to weld the element wires and pressing them simultaneously with the heating. The element wires may be coated wires having insulating coatings, or may not be coated wires. Even when the element wires are coated wires, the conductors of the element wires are welded to one another because the insulating coatings are melted during the fusing processing. Therefore, the plurality of element wires are welded at the connection end portions 13, 23, whereby single-core conductors are substantially formed.

A cylindrical extension portion 14 extending in the axial direction is formed at the connection end portion 13 of the electric wire 10 by the fusing processing. Further, a concave portion 15 extending in the axial direction toward the inside of the extension portion 14 is formed on the tip surface 14a of the extension portion 14. In the present embodiment, the concave portion 15 is formed in a conical shape. Note that the concave portion 15 can be formed by performing fusing processing using a press jig having a conical jig portion so that the concave portion 15 has the shape of the jig portion. Further, when no conical jig portion is used, after the fusing processing, the concave portion 15 may be scraped out to have a conical shape by performing machining processing using a drill or the like.

A cylindrical extension portion 24 extending in the axial direction, and a protruding portion 25 further extending from the end portion of the extension portion 24 up to the tip in the axial direction are formed at the connection end portion 23 of the electric wire 20 by the fusing processing. The protruding portion 25 has at least a tapered portion 26 that tapers toward the tip. In the present embodiment, the protruding portion 25 forms the tapered portion 26 over the entire length thereof, but a partial area of the protruding portion 25 in the overall length range thereof may partially form a tapered portion. For example, in the example of FIG. 1, the protruding portion 25 may partially have one or more cylindrical portions extending in the axial direction.

In the present embodiment, the protruding portion 25 is formed into a conical shape like the concave portion 15. It is preferable that the apex angles of these conical shapes are substantially the same angle so that the protruding portion 25 fits into the concave portion 15. The protruding portion 25 is subjected to fusing processing using a press jig including a jig portion having a conical inner space therein, whereby the protruding portion 25 can be formed to have the shape of the jig portion. Further, after the fusing processing, the protruding portion 25 may be scraped out to have a conical shape by performing machining processing using a polishing device.

The concave portion 15 and the protruding portion 25 are formed to have complementary shapes at least at their tip portions. Therefore, when the protruding portions 25 are inserted into the concave portion 15 to be butted against each other, the outer circumferential surface of the tip portion of the protruding portion 25 comes into close contact with the inner circumferential surface of the concave portion 15. Furthermore, crimping force is applied in the axial center direction by the connecting member 30, so that the degree of the close contact between the protruding portion 25 and the concave portion 15 increases, and thus the contact resistance between the electric wire 10 and the electric wire 20 at the connection site is reduced. As a result, in the connection structure S of the present embodiment, as shown in FIG. 1, current I can also be caused to flow through at least center portions in the radial direction of the electric wire conductors in addition to the connecting member 30 at the connection site between the electric wire 10 and the electric wire 20. As described above, in the present embodiment, the inner circumferential surface of the concave portion 15 and the outer circumferential surface of the protruding portion 25 are inclined with respect to the axial direction, so that it is easier to secure a larger contact area as compared with a structure in which the end faces substantially perpendicular to the axial direction are simply butted against each other as in a conventional wire harness, and it is also possible to surely connect the electric wires 10 and 20.

The connecting member 30 is a cylindrical conductive member made of metal (e.g., copper, copper alloy, or the like). In the present embodiment, the connecting member 30 has a cylindrical shape, and has an inner diameter slightly larger than the outer diameters of the extension portions 14, 24. The connection end portions 13, 23 have been inserted into the connecting member 30 from both the ends thereof to a position in which the protruding portion 25 is inserted into the concave portion 15. Under this insertion state, the connecting member 30 is deformed at least partially from the radial-direction outer side to the radial-direction inner side by a crimping device, whereby the connecting member 30 is press-fitted (that is, crimped) to the connection end portions 13, 23.

Figure 5:
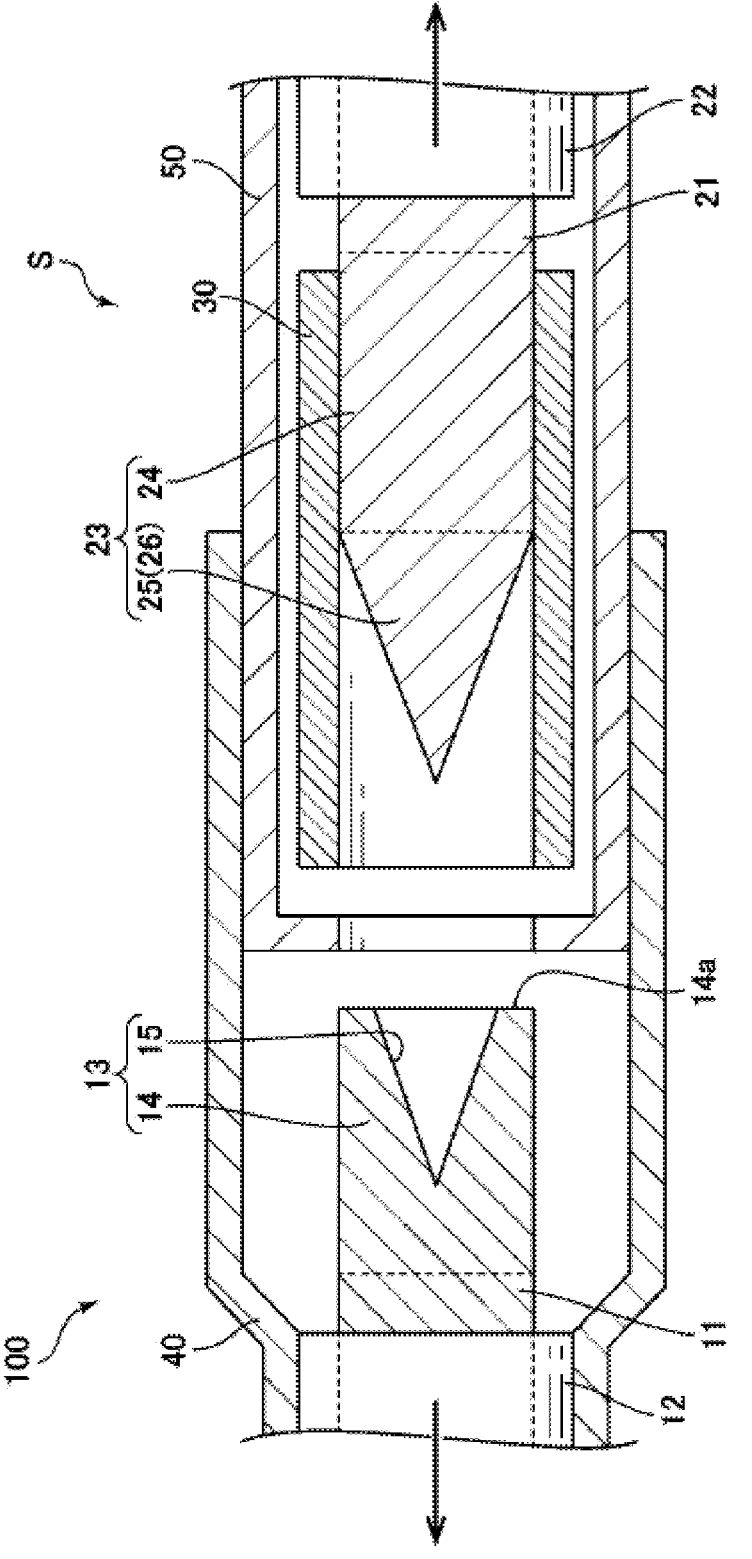
FIG. 5 is an explanatory diagram showing a state in which tensile force is applied to the wire harness according to one or more exemplary aspects of the present disclosure.

Further, the end portions of the electric wires 10, 20 are covered with insulating cover members 40, 50, respectively. The cover member is, for example, a heat-shrinkable tube. The cover members 40, 50 are attached to cover the connection site after the connection end portions 13, 23 are crimped and connected to each other by the connecting member 30. The cover member 50 is fixedly attached to the electric wire 20 at the base side (the right side in FIG. 1), and the tip side (the left side in FIG. 1) thereof extends from the electric wire 20 at least beyond the connecting member 30 in the axial direction, and completely covers the connecting member 30. Further, the cover member 40 is fixedly attached to the electric wire 10 at the base side (the left side in FIG. 1) thereof, and the tip side (the right side in FIG. 1) thereof extends from the electric wire 10 to at least a position beyond the extension portion 14 in the axial direction and further extends to a position beyond the connecting member 30, thereby completely covering the extension portion 14 and the connecting member 30. Note that the cover member 40 and the cover member 50 are in close contact with each other, but as shown in FIG. 5 described later, they are arranged so as to be slidable relatively to each other at a portion where they overlap each other.

In the present embodiment, the connecting member 30 is pressed from the entire circumferential direction toward the axial center over its entire length by the crimping device, so that the diameter of the connecting member 30 is reduced, and is brought into pressure-contact with the extension portions 14, 24 of the connection end portions 13, 23 over the entire inner circumferential surface thereof. At this time, the connecting member 30 is arranged so that the contact area between the connecting member 30 and the extension portion 14 and the contact area between the connecting member 30 and the extension portion 24 are approximately the same level. In FIG. 1, the respective contact lengths L1 and L2 are approximately the same length. As a result, the connection end portions 13, 23 are crimped with substantially the same crimping force by the connecting member 30.

When the connecting member 30 is crimped as described above, the extension portion 14 is crimped to the protruding portion 25.

FIGS. 2 and 3 show a state in which the connection structure S is rotated by 90 degrees in the circumferential direction from FIG. 1. As shown in FIG. 2, in the present embodiment, the connecting member 30 is not only reduced in diameter from the entire circumferential direction as described above, but also partially pressed at a part thereof in the circumferential direction by press working or the like to form deformed concave portions 31 and 32. The deformed concave portions 31, 32 are formed by deforming the connecting member 30 toward the radial-direction inner side at two opposing locations of the connecting member 30 which are spaced apart from each other by approximately 180 degrees in the circumferential direction in the connection end portions 13 and 23, respectively. As a result, locations in the axial direction of the extension portions 14, 24 of the connection end portions 13, 23 which correspond to the deformed concave portions 31, 32 are firmly crimped with approximately the same crimping force by the connecting member 30. Note that at each connection end portion, the number of deformed concave portions is not limited to two, but may be one or more. In this case, it is preferable that the number of deformed concave portions to be provided on the connection end portions 13 and 23 is the same, or that the number of deformed concave portions to be provided on the connection end portion 23 is larger in order to further increase the crimping force.

As shown in FIG. 2, the deformed concave portion 31 is formed within a length range A in which the protruding portion 25 is inserted into the concave portion 15, or so as to overlap the range A. Further, as shown in FIGS. 4A and 4B, when the deformed concave portions 31, 32 are formed, the locations of the extension portions 14, 24 of the connection end portions 13, 23 which correspond to the deformed concave portions 31, 32 are pressed in the direction to the axial center, and crimped to protruding portion 25.

Further, in the present embodiment, the connecting member 30 is connected to the connection end portions 13, 23 by the crimping connection including both of the crimping connection in which the connecting member 30 is pressed from the entire circumferential direction to be reduced in diameter and the crimping connection by the deformed concave portions 31, 32. However, only one of the crimping connection by the reduction in size from the entire circumferential direction and the crimping connection by the deformed concave portions 31, 32 may be used.

Next, referring to FIG. 5, an operation of breaking the connection structure S of the wire harness of the present embodiment will be described. FIG. 5 is an explanatory diagram of a state in which tensile force is applied to the wire harness. In the present embodiment, in the event of a vehicle collision, the wire harness 100 is configured so that the connection structure S is broken when predetermined tensile force is applied to the wire harness 100.

Specifically, in the present embodiment, as shown in FIG. 5, when predetermined tensile force is applied to the electric wire 10 and the electric wire 20 in the axial direction, the connection between the connecting member 30 and the connection end portion 13 is preferentially broken although the connecting member 30 and the connection end portions 13, 23 are crimped together with the same degree of crimping force. In the present embodiment, the engagement force (crimping force) between the connecting member 30 and the extension portion 14 and the engagement force (crimping force) between the connecting member 30 and the extension portion 24 are set to substantially the same in a state where there is no tensile force.

However, the connecting member 30 and the extension portion 14 are crimped and connected to each other with the protruding portion 25 being inserted into the concave portion 15 inside the extension portion 14. Therefore, when the protruding portion 25 moves slightly in a direction away from the concave portion 15 in the axial direction due to tensile force, the engagement force between the connecting member 30 and the extension portion 14 is slightly relaxed. In other words, since the concave portion 15 and the protruding portion 25 are in contact with each other with being inclined with respect to the axial direction in which the tensile force acts, the sliding friction when the concave portion 15 and the protruding portion 25 are pulled apart from each other is reduced. Therefore, the concave portion 15 and the protruding portion 25 can be pulled apart from each other with predetermined strong pulling force. When the concave portion 15 and the protruding portion 25 are pulled apart from each other even slightly, there occurs room which allows the extension portion 14 to sag toward the radial-direction inner side, so that the engagement force between the extension portion 14 and the connecting member 30 is relaxed.

On the other hand, even when tensile force is applied, the engagement force between the connecting member 30 and the extension portion 24 is not relaxed. Therefore, when predetermined tension is applied, the engagement force between the connecting member 30 and the extension portion 14 becomes smaller than the engagement force between the connecting member 30 and the extension portion 24, so that the engagement between connecting member 30 and extension portion 14 is broken.

In this way, the present embodiment is configured such that the connection structure S is easily severed when tensile force is applied to the wire harness 100. Accordingly, by forming the connection structure S at an appropriate position of the wire harness 100 between electrical components to be connected, it is possible to easily control a position where the wire harness 100 is severed in the event of a collision.

Further, in the present embodiment, the connection end portion 13 of the electric wire 10 is completely covered in the axial direction by the cover member 40 during severing, and the connection end portion 23 of the electric wire 20 and the connecting member 30 are completely covered in the axial direction by the cover member 50. As described above, the connection structure S of the present embodiment has a touch protection structure for preventing the conductor portions from being exposed to the outside, and it is possible to surely prevent current from flowing to other structures of the vehicle.

Next, a modification of the present embodiment will be described with reference to FIGS. 6 and 7. FIG. 6 is an explanatory diagram of an electric wire having a protruding portion according to the modification, and FIG. 7 is a cross-sectional view of an extension portion according to the modification.

As shown in FIG. 6, the electric wire 20 can have various tapered protruding portions. Further, a concave portion having a shape which is complementary to each of the shapes of these protruding portions is formed in the electric wire 10.

Figures 6A, 6B, 6C:
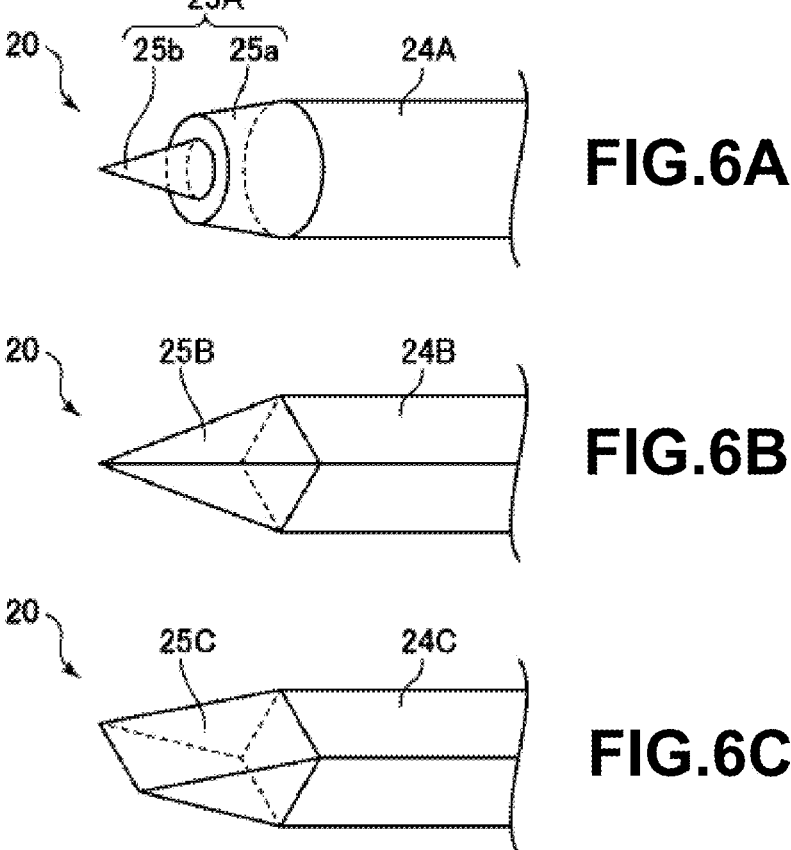
FIG. 6A is an explanatory diagram of an electric wire having a protruding portion according to one or more exemplary aspects of the present disclosure.
FIG. 6B is an explanatory diagram of an electric wire having a protruding portion according to one or more exemplary aspects of the present disclosure.
FIG. 6C is an explanatory diagram of an electric wire having a protruding portion according to one or more exemplary aspects of the present disclosure.
Figure 7:
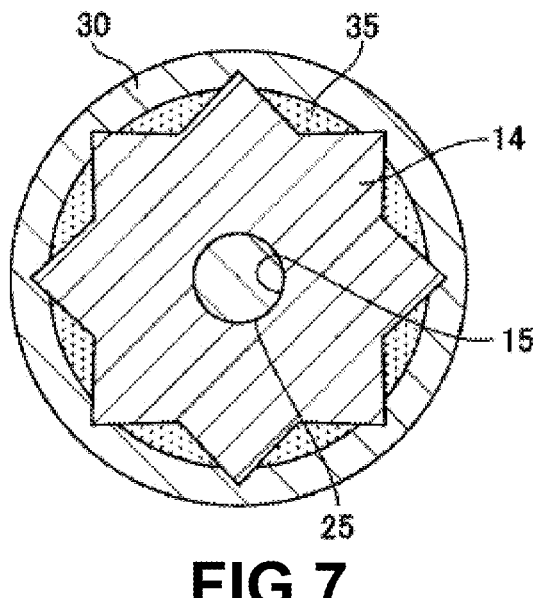
FIG. 7 is a cross-sectional view of an extension portion according to one or more exemplary aspects of the present disclosure.

In FIG. 6A, a protruding portion 25A is provided to be continuous to a cylindrical extension portion 24A. The protruding portion 25A includes a truncated conical portion 25a and a small-diameter conical portion 25b which is provided with a step difference being interposed between the small-diameter conical portion 25b and the truncated conical portion 25a. The apex angle of a virtual cone of the truncated conical portion 25a is smaller than the apex angle of the conical portion 25b. In other words, the inclination angle of the circumferential surface of the truncated conical portion 25a is set to be smaller than the inclination angle of the circumferential surface of the conical portion 25b with respect to the axial direction. As a result, under a state where the periphery of the protruding portion 25A is crimped by the connecting member 30, it is possible to make a difference between the crimping forces of the truncated conical portion 25a and the conical portion 25b against the extension portion 14, or between the engagement forces of the truncated conical portion 25a and the conical portion 25b with the extension portion 14 when tension is applied to the wire harness 100. The truncated conical portion 25a and the conical portion 25b are both tapered portions. Note that in the protruding portion 25A of FIG. 6A, a cylindrical portion may be provided between the truncated conical portion 25a and the conical portion 25b. In this case, the truncated conical portion 25a and the conical portion 25b are also tapered portions.

In FIG. 6B, a protruding portion 25B is provided to be continuous to an extension portion 24B having a rectangular cross section, and the protruding portion 25B is formed to have a quadrangular pyramid shape. In this example, the protruding portion 25B is a tapered portion. Further, in FIG. 6C, a protruding portion 25C is provided to be continuous to an extension portion 24C having a rectangular cross section, and the protruding portion 25C is formed to have a bottom surface having a rectangular triangular prism shape. In this example, the protruding portion 25C is a tapered portion.

In FIG. 7, the extension portion 14 is formed to have a star octagonal shape in cross-section and extends in the axial direction. The concave portion 15 may be formed to have a conical shape as in FIG. 1. The connecting member 30 has a cylindrical shape, and the connecting member 30 is pressed from the entire circumferential direction toward the axial center to be reduced in diameter, whereby eight corner portions of the extension portion 14 bite into the connecting member 30 to be crimped to the connecting member 30. In this case, the extension portion 14 is not in contact with the inner circumferential surface of the connecting member 30 over the entire circumferential surface, but is in contact with the connecting member 30 at a plurality of contact portions in cross-sectional view, so that the contact area of the extension portion 14 with the connecting member 30 is reduced. Further, at non-contact portions other than the contact portions, space is created between the extension portion 14 and the connecting member 30. However, in this example, this space is filled with a conductive adhesive 35 such as silver paste, thereby ensuring high electrical conductivity between the extension portion 14 and the connecting member 30.

In the example of FIG. 7, such a structure reduces the engagement force between the extension portion 14 and the connecting member 30 as compared with the case where the extension portion 14 having a circular shape in cross-section in the embodiment of FIG. 1 is in contact with the inner circumferential surface of the connecting member 30 over the entire circumferential surface of the extension portion 14. Therefore, by applying the crimping connection of FIG. 7 to the extension portion 14 having a star octagonal shape in cross-section and applying the crimping connection of FIG. 1 to the extension portion 24 having a circular shape in cross-section, the engagement force between the extension portion 14 and the connecting member 30 can be made still smaller than the engagement force between the extension portion 24 and the connecting member 30. This makes it possible to surely break the connection between the extension portion 14 and the connecting member 30 more preferentially than the connection between the extension portion 24 and connecting member 30 when the tension is applied to the wire harness 100.

Further, in FIG. 7, the extension portion 14 is formed to have a star octagonal shape in cross-section, but it may be formed to have a star polygonal shape in cross-section or a polygonal shape in cross-section. Even in this case, the extension portion 14 and the cylindrical connecting member 30 can be brought into contact with each other, not over the entire circumferential surface, but only partially. Further, as shown in FIG. 7, as another method of reducing the contact area between the connecting member and the extension portion, the extension portion may be formed to have a circular shape in cross-section and the connecting member may be formed to have a rectangular shape in cross-section.

Further, in the above embodiment, the extension portions 14 and 24 are formed in a cylindrical shape. However, they are not limited to this shape, and may be formed to have a rectangular shape in cross-section. In this case, the connecting member 30 may have a circular shape in cross-section or a rectangular shape in cross-section as long as the extension portions 14 and 24 can be crimped with the connecting member 30.

Next, the action of the connection structure S of the wire harness of the present embodiment will be described.

In the present embodiment, in the connection structure S of the wire harness in which the electric wire 10 and the electric wire 20 are connected to each other by the connecting member 30, the end portions of the electric wire 10 and the electric wire 20 are provided with the connection end portion 13 and the connection end portion 23 respectively by performing fusing processing on the conductors 11, 21 of the end portions, the connection end portion 13 includes the extension portion 14 extending in the axial direction of the electric wire 10, and the concave portion 15 extending from the end surface 14a of the extension portion 14 into the extension portion 14, the connection end portion 23 includes the extension portion 24 extending in the axial direction of the electric wire 20, and the protruding portion 25 extending from the extension portion 24 to the tip in the axial direction, the protruding portion 25 is at least partially provided with a tapered portion 26 that tapers toward the tip in the axial direction, and the connection end portion 13 and the connection end portion 23 are integrally connected to each other by crimping the extension portion 14 and the extension portion 24 from the radial-direction outer side with the connecting member 30 while the protruding portion 25 is inserted in the concave portion 15.

Conventionally, the end surfaces of two electric wires that are substantially perpendicular to the axial direction are simply butted against each other and connected to each other by crimping using a connecting member. Therefore, direct physical contact between the two electric wires is insufficient, and also the contact area thereof is small. On the other hand, in the present embodiment, the extension portion 14 of the electric wire 10 and the extension portion 24 of the electric wire 20 are crimped by the connecting member 30 while the protruding portion 25 of the extension portion 24 on which the fusing processing has been performed is inserted in the concave portion 15 of the extension portion 14 on which the fusing processing has also been performed. As a result, in the present embodiment, under the connection state, the electric wire 10 and the electric wire 20 are surely electrically connected to each other by the physical connection between the concave portion 15 and the protruding portion 25, and it is easier to secure a larger contact area as compared with the simple contact between the end surfaces perpendicular to the axial direction as in the case of a conventional wire harness. Therefore, in the present embodiment, at the connection site between the two electric wires 10 and 20, the current tends to dispersedly flow not only through the outer edges of the electric wires, but also over substantially the entire cross section of the conductor portion, so that the risk of damage at the outer edge portions of the electric wires is extremely reduced. Therefore, in the present embodiment, there is no need to use an electric wire having a conductor portion having a larger diameter in consideration of damage to the outer edge portion, and it is possible to use an electric wire having a smaller diameter than that in a conventional wire harness, so that the weight of the wire harness 100 can be reduced.

Further, the present embodiment is configured such that the extension portion 14 is crimped by the connecting member 30 in the connection end portion 13, and the tapered portion 26 inserted in the concave portion 15 is pressed to the radial-direction inner side by the extension portion 14 so that the engagement force between the extension portion 14 and the connecting member 30 becomes weaker than the engagement force between the extension portion 24 and the connecting member 30 when tension is applied to the electric wire 10 and the electric wire 20, and is configured such that when predetermined tension is applied to the electric wire 10 and the electric wire 20 in the axial direction, the tapered portion 26 and the concave portion 15 are separated from each other in the axial direction, and the engagement between the extension portion 14 and the connecting member 30 is released.

For example, in a conventional wire harness as shown in Patent Literature 1, two electric wires are firmly crimped (crimped and connected) by a connecting member, so that the electric wires are hard to disconnect at the connection site in the event of a vehicle collision. For this reason, with respect to this wire harness, it has not been possible to predict sites other than the connection site in the overall length direction of the wire harness at which the wire harness may be severed in the event of a collision. For example, in a vehicle having an in-wheel motor, a battery is provided on the vehicle body side, the in-wheel motor is provided integrally with the wheel, and the battery and the in-wheel motor are connected to each other by a wire harness. In such a vehicle, when the wire harness is severed at an unintended (inappropriate) site during a collision, a conductor at a severed portion may be exposed, and thus there is a risk that it is impossible to surely maintain protection of so-called direct contact.

On the other hand, the present embodiment is configured such that the connecting member 30 crimps the extension portion 14 and the extension portion 24 while the tapered portion 26 of the protruding portion 25 is inserted in the concave portion 15 of the extension portion 14. Therefore, when predetermined tension is applied to the electric wire 10 and the electric wire 20, the engagement between the concave portion 15 and the tapered portion 26 is loosened, so that the engagement force between the extension portion 14 and the connecting member 30 is more likely to be reduced than the engagement force between the extension portion 24 and the connecting member 30. In other words, in the present embodiment, since the tapered portion 26 and the concave portion 15 are in contact with each other to be inclined with respect to the axial direction, when a tensile force is applied, it is possible to separate them from each other. When the tapered portion 26 is pulled even slightly apart from the concave portion 15, there occurs room for the extension portion 14 sagging into the radial-direction inner side, which causes the engagement force between the extension portion 14 and the connecting member 30 to be relaxed, so that it is possible to separate them from each other. Accordingly, in the present embodiment, when predetermined tension is applied to the wire harness 100 during a vehicle collision, the electric wire 10 can be easily separated from the connecting member 30. Therefore, in the present embodiment, by arranging the connection structure S of the wire harness at an appropriate position in the vehicle, it is possible to control the severing position of a wire harness such that the wire harness is severed at an appropriate severing position in the event of a vehicle collision.

Further, the present embodiment is further provided with the cover member 40 that covers the connection end portion 13, and the cover member 50 that covers the connection end portion 23, the cover member 40 extends from the electric wire 10 beyond the extension portion 14, and the cover member 50 extends from the electric wire 20 beyond the connecting member 30.

In the connection structure of the conventional wire harness, when a large tensile force is applied and the connection site between two electric wires is severed, there is a risk that current flows from an exposed conductor of the severed portion to an external object (another in-vehicle component, an occupant or the like) which comes into contact with the exposed conductor. However, in the present embodiment configured as described above, when predetermined tension is applied to the wire harness 100 and the electric wire 10 and the electric wire 20 are separated from each other at the connection site, the extension portion 14 is covered by the cover member 40, and the extension portion 24 and the connecting member 30 are covered by the cover member 50, so that it is possible to surely prevent the conductor portion of the wire harness 100 from being exposed to the outside with a simple configuration. In this way, the present embodiment can provide a structure for reliable touch protection in the event of a vehicle collision.

Further, in the present embodiment, the extension portion 14 has a polygonal shape in cross-section or a star polygonal shape in cross-section, and is in contact with the connecting member 30 at a plurality of locations in cross-sectional view in a state where the extension portion 14 is crimped by the connecting member 30. In the thus-configured present embodiment, it is possible to further reduce the engagement force between the extension portion 14 and the connecting member 30. For this reason, in the present embodiment, when predetermined tension is applied to the wire harness 100, the connection between the extension portion 14 and the connecting member 30 can be surely more preferentially released than the connection between the extension portion 24 and the connecting member 30.

Furthermore, in the present embodiment, the conductive adhesive 35 is filled in the non-contact sites between the connecting member 30 and the extension portion 14 in cross-sectional view. In the thus-configured present embodiment, it is possible to ensure high conductivity between the connecting member 30 and the extension portion 14.

Further, in the present embodiment, specifically, the tapered portion 26 is more reduced in diameter toward the tip in the axial direction so as to be tapered to the tip in the axial direction.

Furthermore, in the present embodiment, the concave portion 15 and the protruding portion 25 have shapes that complementarily engage with each other at least in the tip region of the protruding portion 25. In the thus-configured present embodiment, it is possible to surely bring the inner circumferential surface of the concave portion 15 and the outer circumferential surface of the protruding portion 25 into surface contact with each other.

The invention claimed is:

1. A connection structure of a wire harness, comprising:
a first electric wire and a second electric wire connected to each other by a connecting member, wherein
end portions of the first electric wire and the second electric wire are respectively provided with a first connection end portion and a second connection end portion in which conductors of the end portions have been subjected to fusing processing,
the first connection end portion comprises a first extension portion extending in an axial direction of the first electric wire, and a concave portion extending from an end surface of the first extension portion into the first extension portion,
the second connection end portion comprises a second extension portion extending in an axial direction of the second electric wire, and a protruding portion extending from the second extension portion to a tip in an axial direction thereof, the protruding portion comprising at least partially a tapered portion that is tapered toward a tip in an axial direction thereof, and
the first connection end portion and the second connection end portion are integrally connected to each other by crimping the first extension portion and the second extension portion from a radial-direction outer side by the connecting member in a state where the protruding portion is inserted in the concave portion,
wherein the first extension portion has a polygonal shape in cross-section or a star polygonal shape in cross-section, and is in contact with the connecting member at a plurality of sites in cross-sectional view in a state where the first extension portion is crimped by the connecting member, and
wherein a conductive adhesive is filled in a non-contact site between the connecting member and the first extension portion in cross-sectional view.

2. The connection structure of the wire harness according to claim 1,
wherein the concave portion and the tapered portion have contact surfaces that are inclined with respect to the axial direction,
wherein the first extension portion is crimped by the connecting member at the first connection end portion in a state where the tapered portion is inserted in the concave portion, such that the tapered portion is inserted in the concave portion inside the first extension portion,
wherein the connection structure is configured such that, when tension is applied to the first electric wire and the second electric wire in the axial direction, the inclined contact surfaces between the tapered portion and the concave portion cause the tapered portion to slide in a direction away from the concave portion, thereby creating room for the first extension portion to deform toward a radial-direction inner side, whereby an engagement force between the first extension portion and the connecting member becomes weaker than an engagement force between the second extension portion and the connecting member, and wherein when tension of a magnitude sufficient to separate the tapered portion and the concave portion from each other is applied to the first electric wire and the second electric wire in the axial direction, the tapered portion and the concave portion are separated from each other in the axial direction, and engagement between the first extension portion and the connecting member is released.

3. The connection structure of the wire harness according to claim 1, further comprising:

a first cover member that covers the first connection end portion, and a second cover member that covers the second connection end portion, wherein the first cover member extends from the first electric wire beyond the first extension portion, and the second cover member extends from the second electric wire beyond the connecting member.

4. The connection structure of the wire harness according to claim 1, wherein the tapered portion is reduced in diameter toward the tip in the axial direction thereof so as to be tapered toward the tip in the axial direction.

5. The connection structure of the wire harness according to claim 1, wherein the concave portion and the protruding portion have shapes that complementarily engage with each other at least in a tip region of the protruding portion.

\* \* \* \* \*